Jan. 10, 1950     F. A. BALLOU, JR     2,493,940
SOLDER CARRIER FINDING
Filed June 21, 1944
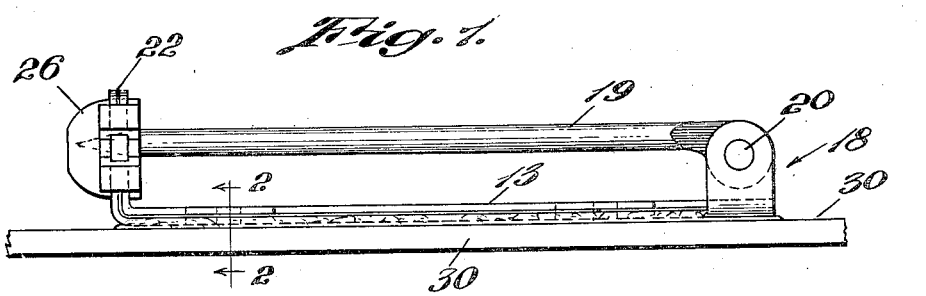
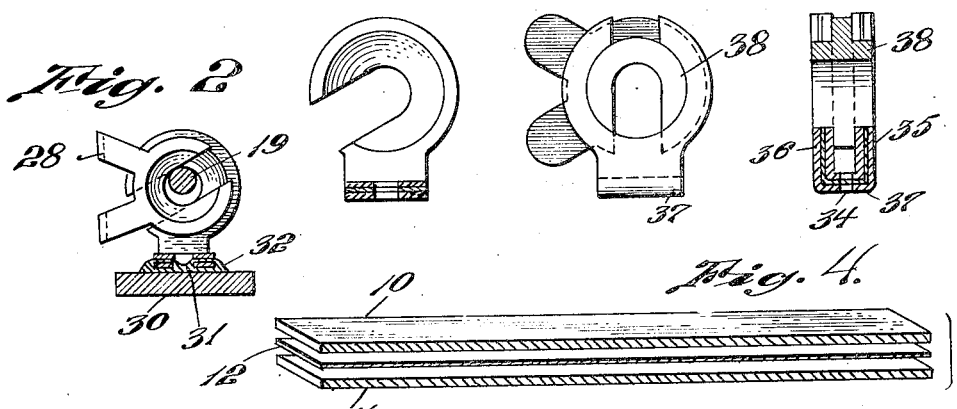
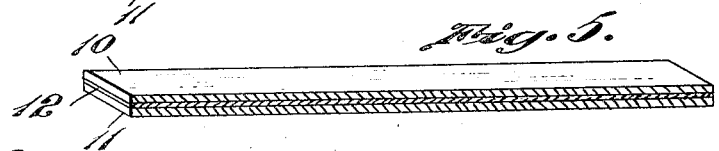
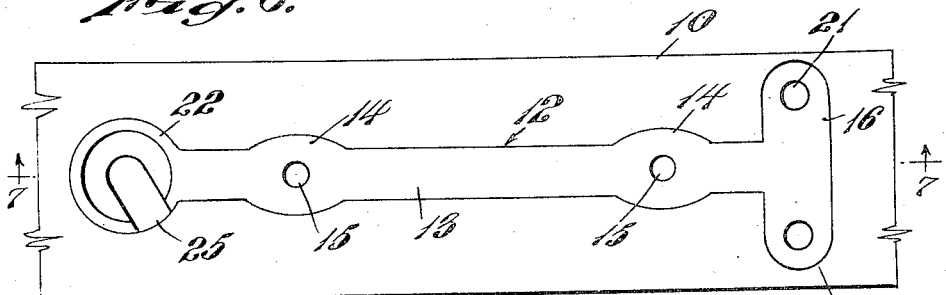
INVENTOR
Frederick A. Ballou Jr.
BY Barlow & Barlow
ATTORNEYS Patented Jan. 10, 1950

2,493,940

UNITED STATES PATENT OFFICE 2,493,940

SOLDER CARRIER FINDING

Frederick A. Ballou, Jr., Providence, R. I., assignor to B. A. Ballou & Co. Incorporated, a corporation of Rhode Island Application June 21, 1944, Serial No. 541,422

1 Claim. (Cl. 63—20)

This invention relates to a jewelry finding, such for instance as a safety catch, pin stem joint, ear clip, pin back, button post, or the like of the type which is designed to be secured to some other article or ornament for assembly therewith.

Jewelry findings are usually formed from precious or base metal in tools and attached by solder to some ornament or article with which they are to be assembled. The addition of a separate piece of solder to the joint at the time the finding and the article to which it is to be attached are assembled, requires considerable skill and consumes time in the placing of the solder in the correct position and then placing the finding in the desired position for attachment.

One of the objects of this invention is to provide a jewelry finding which will have solder as a part thereof for attaching the finding in position so that it will be unnecessary to handle this solder separately.

Another object of this invention is to provide a finding with just the right amount of solder needed so that a skilled operator need not be required for attachment of the finding in position.

Another object of this invention is to provide solder in the correct location so that the same may be made available either during the forming of the finding or by cutting away a part of the finding to expose the solder.

Another object is to provide solder in a location which will not interfere with the usual formation of the finding but rather one which may be worked with the tools already in use and in the same manner as heretofore but merely with the choice of a differently prepared stock.

With these and other objects in view, the invention consists of certain novel features of construction, as will be more fully described and particularly pointed out in the appended claim.

In the accompanying drawings:

Fig. 1 is an elevation of this invention in the form of a pin back attached in position;

Fig. 2 is a section on line 2—2 of Fig. 1;

Fig. 3 is a section on a larger scale illustrating the finding prior to attachment and with the rotor removed;

Fig. 4 shows the separate parts of stock which go to form up the unit from which the finding is formed;

Fig. 5 is a view similar to Fig. 4 but showing the parts assembled in attached relation;

Fig. 6 is a plan view illustrating the blanking of the finding from the stock of Fig. 5;

Fig. 7 is a sectional view on substantially line 7—7 of Fig. 6;

Fig. 8 is an end view of a modified construction showing a catch alone; and

Fig. 9 is a sectional view thereof.

In proceeding with this invention I provide laminated stock in which one of the plies of lamination will be solder. The solder serves to hold the adjacent laminations together and the laminations serve to hold the solder for attaching purposes when the finding is made of this laminated stock.

With reference to the drawing 10 designates one ply and 11 another ply between which a ply 12 of solder is provided. The solder serves to hold the plies 10 and 11 in assembled relation to form a sheet stock which may be rolled to the desired thickness and from which a blank designated 12 may be cut as shown in plan in Fig. 6.

This blank consists of a strip of stock 13 having enlarged portions 14 with openings 15 formed therethrough. At one end ears 16 and 17 are formed which are bent up into parallel relation as shown at 18 in Fig. 1 so as to provide a pin stem joint for the pin stem 19 which may have trunnions 20 extending into the openings 21 in ears 16 and 17. At the other end a post 22 is provided suitably concaved as at 23 and convexed as at 24 and slotted as at 25 for the reception of a pin stem 19.

A rotor member 26 having two ears is bent to extend on either side of the post 22, one of which ears is concaved to receive the convexed portion 24 and the other of which is convexed to enter concaved portion 23 of the post. This rotor is suitably slotted so that the slot may be moved to register with the slot 25 or may be moved to a position so that the slot will be out of registry for locking the pin stem 19 in position. Suitable handles 28 may be formed for rotation of this keeper.

It is desired to attach this assembly such as shown in Fig. 1 to the base or ornament 30, also shown in Fig. 2. The edges of the stock which are cut as the blank 12 is formed leave the solder exposed along these edges. Also solder is exposed at the opening 15. Thus, in order to attach this pin back to the support or ornament 30 it is merely necessary to apply flux where contact occurs between the parts and to heat the bar portion 30 so that solder will run from the edges into the openings 15 as at 31 and along the side edges as at 32 as shown in Fig. 2, for attaching this bar to the base or ornament 30. The solder being unitary with the base and at substantially the locations required heating alone is necessary. If it is desired to protect any of the parts against soldering this may be done by coating the parts with some sort of protecting material.

In some cases instead of making a bar with joint and catch as one piece therewith the joint or catch may be formed separately. In Figs. 8 and 9 I have shown a safety catch of a different construction than on the bar formed from this laminated stock. The ears 35 and 36 extend upwardly from a base 37 all bent from a blanked out laminated sheet of stock as shown at 10. The rotor 38 is positioned between the ears in openings in these ears to receive it. Solder in the base 37 may be exposed by an opening 34 extending inward from the outer surface for attachment purposes.

I claim:

A jewelry article comprising an ornamental member, a bar formed of solder sandwiched between plies of a different material with solder exposed at its edge and also having openings inwardly of the peripheral edge to expose solder between said plies, said member and said bar having broad face-to-face surface areas with one of said outerplies contacting said member adjacent the holes and periphery of said bar, said bar being attached to said member by means of the solder exuded from between said plies at the exposed edge of said opening and peripheral edge bridging one of said contacting plies and joining with said member.

FREDERICK A. BALLOU, JR.

REFERENCES CITED

The following references are of record in the file of this patent:

UNITED STATES PATENTS

| Number | Name | Date |
|---|---|---|
| 199,580 | Riker | Jan. 22, 1878 |
| 651,533 | Russell | June 12, 1900 |
| 841,771 | Farnham | Jan. 22, 1907 |
| 1,378,501 | Wall | May 17, 1921 |
| 1,939,732 | Stresau | Dec. 19, 1933 |
| 2,354,409 | Strasser | July 25, 1944 |